US012637953B1

(12) United States Patent
Parekh et al.

(10) Patent No.: US 12,637,953 B1
(45) Date of Patent: May 26, 2026

(54) CENTER TIE ROTOR SEAL

(71) Applicant: RTX Corporation, Farmington, CT (US)

(72) Inventors: Kalpendu J. Parekh, Brookline, MA (US); Daniel L. Carminati, Berlin, CT (US); Rishon C. Saftler, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/250,800

(22) Filed: Jun. 26, 2025

(51) Int. Cl.
*F01D 11/00* (2006.01)
*F01D 11/02* (2006.01)

(52) U.S. Cl.
CPC ............ *F01D 11/005* (2013.01); *F01D 11/02* (2013.01); *F05D 2240/581* (2013.01)

(58) Field of Classification Search
CPC .... F16J 15/4472; F16J 9/00; F16J 9/22; F16J 9/206; F01D 11/02; F01D 11/005; F05D 2240/581
See application file for complete search history.

(56) References Cited

U.S. PATENT DOCUMENTS 1,398,690 A * 11/1921 Hartog ........................ F16J 9/00 92/160
2,579,745 A 12/1951 Lombard et al.
2,618,463 A 11/1952 Lombard et al.
5,197,746 A * 3/1993 Rehfeld ..................... F16J 9/22 277/452
7,066,719 B2 * 6/2006 Aguilar ................. F01D 11/003 415/230
7,563,079 B2 * 7/2009 Aguilar ................. F01D 11/003 415/230
7,775,764 B2 8/2010 Snowsill et al.
10,260,524 B2 4/2019 Hiester

* cited by examiner

*Primary Examiner* — Christine M Mills
*Assistant Examiner* — L. Susmitha Koneru
(74) *Attorney, Agent, or Firm* — Bachman & LaPointe, P.C.

(57) ABSTRACT

A turbine engine rotor has a central shaft and a disk stack having disks encircling the shaft. A first piston seal ring in a first groove in the central shaft has an outer diameter (OD) surface facing or contacting an inner diameter (ID) surface of a disk of said plurality of disks. A second piston seal ring in a second OD groove in the central shaft has an OD surface facing or contacting said ID surface of the same said disk. Holes in the central shaft are between the first groove and the second groove. An additional seal is between the first groove and the holes.

20 Claims, 9 Drawing Sheets

CENTER TIE ROTOR SEAL

BACKGROUND

The disclosure relates to gas turbine engines. More particularly, the disclosure relates to disk-to-shaft sealing in center-tie rotors.

Gas turbine engines (used in propulsion and power applications and broadly inclusive of turbojets, turboprops, turbofans, turboshafts, industrial gas turbines, and the like) often feature center-tie rotors wherein a shaft passes centrally through a rotor disk stack with engagement between the shaft and stack such that the shaft is held in tension and the stack is held in compression.

Operational stresses (including thermal stresses and load stresses) may cause excursions between disks and shaft. Accordingly, there often are seals between disk and shaft. In an example high pressure compressor (HPC) rotor in a multi-spool engine an example sealing system involves a piston seal ring (PSR) held in an outer diameter groove in the shaft and interfacing with an inner diameter (ID) surface of a disk bore. The seal may isolate an inter-disk space aft thereof that's used to pass air radially inward to then pass aft to the turbine section for turbine cooling. Additionally, a diverted airflow may pass radially through holes in the shaft from forward of the seal to pass forward and/or aft within the shaft to provide cooling to other parts of the engine, such as the bearing compartment buffer system.

SUMMARY

One aspect of the disclosure involves a turbine engine rotor comprising: a central shaft; and a disk stack having a plurality of disks encircling the shaft. A first piston seal ring in a first groove in the central shaft has an outer diameter (OD) surface facing or contacting an inner diameter (ID) surface of a disk of said plurality of disks. A second piston seal ring in a second OD groove in the central shaft has an OD surface facing or contacting said ID surface of the same said disk. A plurality of holes in the central shaft are between the first groove and the second groove. An additional seal between the first groove and the plurality of holes.

In a further example of any of the foregoing, additionally and/or alternatively, the additional seal is a non-contact seal.

In a further example of any of the foregoing, additionally and/or alternatively, the additional seal is selected from the group consisting of finger seals and labyrinth seals.

In a further example of any of the foregoing, additionally or alternatively, the additional seal is a finger seal with a base mounted to the shaft and fingers projecting radially outward.

In a further example of any of the foregoing, additionally or alternatively, the additional seal is a labyrinth seal.

In a further example of any of the foregoing, additionally and/or alternatively, the shaft has a second plurality of through-holes axially forward of said second groove and at least partially aft of a bore of a disk immediately forward of said disk.

In a further example of any of the foregoing, additionally or alternatively, relative to the plurality of holes, the second plurality of holes is smaller in total cross-sectional area.

In a further example of any of the foregoing, additionally and/or alternatively, the central shaft has outer diameter surface enhancements between the additional seal and the second OD groove.

In a further example of any of the foregoing, additionally and/or alternatively, the outer diameter surface enhancements are a pattern of ridges.

In a further example of any of the foregoing, additionally and/or alternatively, the shaft is under axial tension.

In a further example of any of the foregoing, additionally or alternatively, the first piston seal ring and the second piston seal ring each have a shiplap split or may have multiple splits.

A further aspect of the disclosure involves a gas turbine engine including the turbine engine rotor. The rotor is a high pressure compressor rotor and further comprises: a high pressure turbine rotor co-spooled with the high pressure compressor rotor on a high spool; a low spool comprising a low pressure compressor rotor and a low pressure turbine rotor; a combustor; and a gaspath sequentially through the low pressure compressor, high pressure compressor, combustor, high pressure turbine, and low pressure turbine.

A further aspect of the disclosure involves a turbine engine rotor comprising: a central shaft; and a disk stack having a plurality of disks encircling the shaft and held in compression by tension in the shaft. A first piston seal ring is in a first groove in the central shaft and has an outer diameter (OD) surface facing or contacting an inner diameter (ID) surface of a first disk of said plurality of disks. A second piston seal ring is in a second OD groove in the central shaft and has an OD surface facing or contacting said ID surface of the first disk. A first plurality of holes is in the central shaft between the first groove and the second groove. A second plurality of-holes axially forward of said second groove and at least partially aft of a bore of a second disk immediately forward of said first disk.

In a further example of any of the foregoing, additionally and/or alternatively, relative to the first plurality of holes, the second plurality of holes is smaller in total cross-sectional area by at least 50%.

In a further example of any of the foregoing, additionally and/or alternatively, one or more of: the rotor is a high pressure compressor rotor of a multi-spool engine; and the second plurality of holes is fully aft of the bore of the second disk.

A further aspect of the disclosure involves a turbine engine rotor comprising a central shaft; and a disk stack having a plurality of disks encircling the shaft and held in compression by tension in the shaft. A first piston seal ring is in a first groove in the central shaft and has an outer diameter (OD) surface facing or contacting an inner diameter (ID) surface of a first disk of said plurality of disks. A plurality of holes is in the central shaft. A non-piston seal ring seal is between the first groove and the plurality of holes.

In a further example of any of the foregoing, additionally or alternatively, the non-piston seal ring seal is a finger seal or a non-contact seal.

In a further example of any of the foregoing, additionally or alternatively, the non-piston seal ring seal is a finger seal.

In a further example of any of the foregoing, additionally or alternatively, the non-piston seal ring seal is a labyrinth seal.

A further example of any of the foregoing may additionally and/or alternatively include: a second piston seal ring in a second OD groove in the central shaft and having an OD surface facing or contacting said ID surface of the first disk, the plurality of holes between the non-piston seal ring seal and the second OD groove; and a second plurality of holes axially forward of said second groove and at least partially aft of a bore of a second disk immediately forward of said first disk.

The details of one or more embodiments are set forth in the accompanying drawings and the description below.

Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

As is discussed further below, a conventional single split ring PSR captured in a shaft outer diameter (OD) groove and sealing against a disk bore inner diameter (ID) surface may be replaced with a two or more stage sealing system. An additional PSR is accommodated in an additional shaft OD groove and also still in engagement with the same disk bore ID surface. In various embodiments, the existing baseline PSR may be preserved unchanged and the additional PSR added. In other embodiments, there may be modifications that may include altering the groove or altering the location of the contact of the baseline PSR. The disk bore is a generally radially inboard portion of a disk protuberant in central axial cross-section with a thinner web extending radially outward to a disk rim which may bear the associated circumferential array of blade airfoils. These may be in the form of separate blades having attachment roots received in slots in the rim or may be blades of an integrally-bladed (e.g., single-piece) rotor. The bore functions to resist outward radial centrifugal pull on the blades in operation. The added stage(s) may avoid or reduce air flow asymmetries and associated deformations and vibrations.

As is discussed further below, the action of the seals may be to create an air system where two streams of flow which may have asymmetry will combine in a mixing chamber before flowing into the intershaft annulus. The mixing chamber may be between the additional PSR and a further non-PSR seal. Asymmetric flow can lead to asymmetric thermal conditions leading to high rotor vibration levels. The resulting air system of the seals results in mixing of the asymmetric air streams minimizes high rotor vibrations even as the contacting seals wear.

Figure 5:
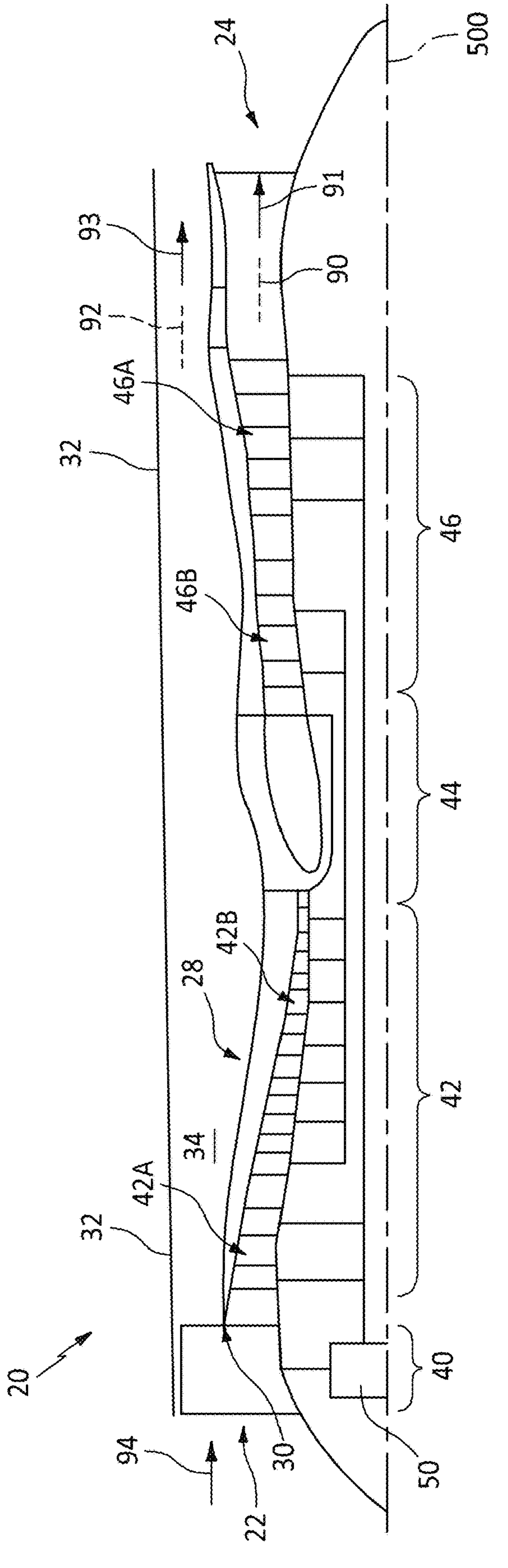
FIG. 5 is a schematic half section of a turbofan engine.

FIG. 5 shows a gas turbine engine 20. As is discussed below, the engine is illustrated as a schematic modification of a baseline existing engine. FIG. 5 schematically shows the example gas turbine engine 20 as a turbofan engine having a centerline or central longitudinal axis 500 and extending from an upstream end at an inlet 22 to a downstream end at an outlet 24. The example engine schematically includes a core flowpath or gaspath 90 passing a core flow 91 and a bypass flowpath 92 passing a bypass flow 93. The core flow and bypass flow are initially formed by respective portions of a combined inlet airflow 94 divided at a splitter 30. Thus, the example core flow starts out as air and downstream of the combustor comprises combustion products as combustion gas.

A core case (inner diameter (ID) case) or other structure 28 divides the core flowpath from the bypass flowpath. The bypass flowpath is, in turn, surrounded by an outer case (outer diameter (OD) case) 32 which, depending upon implementation, may be a fan case. A bypass duct 34 is configured radially between the ID case and OD case. From upstream to downstream, the engine includes a fan section 40 having one or more fan blade stages, a compressor 42 having one or more sections 42A, 42B each having one or more blade stages, a combustor 44 (e.g., annular, can type, or reverse flow), and a turbine 46 again having one or more sections 46A, 46B each having one or more blade stages. For example, many so called two-spool engines have two compressor sections (low pressure 42A and high pressure 42B) and two turbine sections (high pressure 46B and low pressure 46A) with each turbine section driving a respective associated compressor section and the low pressure downstream turbine section 46A also driving the fan (optionally via a gear reduction 50). Yet other arrangements are possible.

Various illustrated and non-illustrated features of the engine may be otherwise conventional including basic control hardware, programming, and use and manufacture methods.

Figure 1:
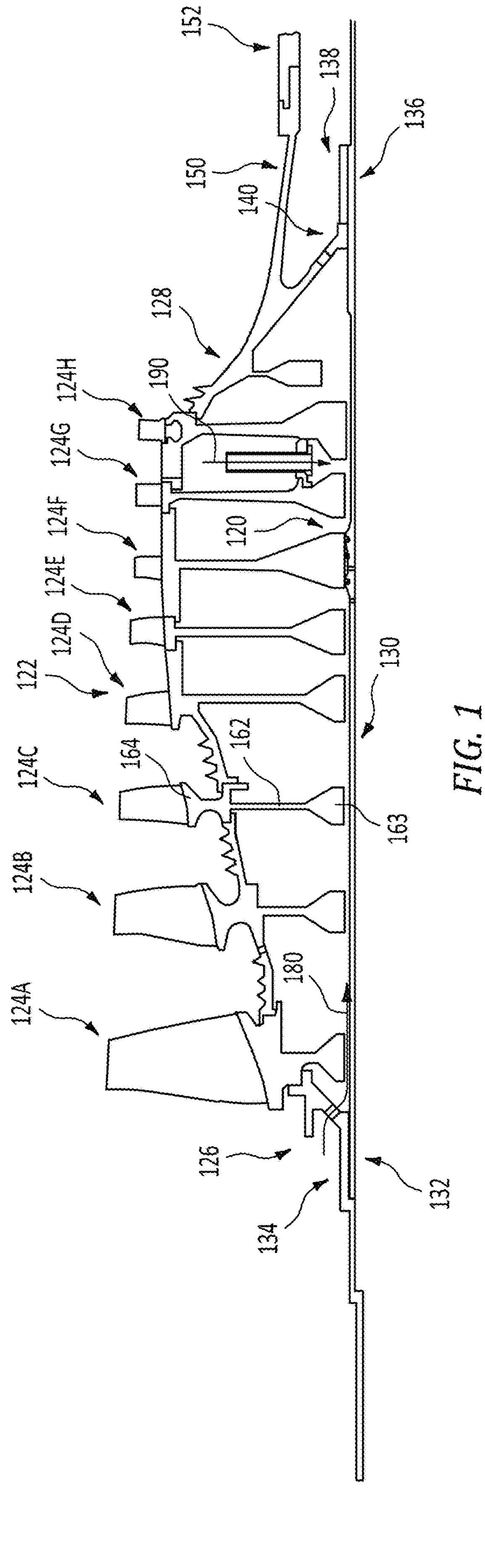
FIG. 1 is a half sectional view of a high pressure compressor (HPC) rotor.

FIG. 1 shows a seal system 120 in the HPC rotor 122. The example rotor comprises a stack of disks 124A-124H. In this particular example, disks 124A-124G are known as "integrally-bladed rotors" (IBR) or "bladed disks" (blisks); whereas, the disk 124H has a circumferential array of blades mounted at the outer rim of the disk. The various disks have spacers extending fore or aft to mate with adjacent disks. FIG. 1 shows some of these spacers having radially inwardly open/facing distal shoulder surfaces receiving shoulders of the adjacent disk whereas others have radially outwardly open/facing shoulder surfaces. For example, the disk 124B has a forward spacer with a radially inwardly open shoulder and a rearward spacer with a radially outwardly open shoulder. Some of the spacers have radially outwardly protruding knife edges for cooperating with abradable material at inboard/inner platforms or shrouds of vane stages to create respective knife edge sealing systems.

The disk stack is held in axial compression between a forward hub 126 and an aft or rearward hub 128 to form a rotor stack. The term "rotor" is often interchangeably used to identify anything from a single disk (e.g., as in IBR noted above), expanding in scope to the disk stack (without hubs or shaft), then further to the extent of including the hubs and the shaft but only within a given section (e.g., treating the HPC and HPT rotor sections as distinct rotors), and up to an entire structure that rotates as a unit (which would include the HPC rotor, the HPT rotor, and the shaft all as a high speed rotor).

The example fore and aft hubs each have distal radially outwardly open shoulders mating with the adjacent disk. A tension shaft 130 holds the rotor under compression while the adjacent portion of the shaft is under tension. The example shaft 130 has an externally threaded forward end section 132 engaged to an internally threaded compartment 134 of the forward hub to transmit axial forces. The shaft 130 also has a second externally threaded portion 136 well aft thereof receiving a nut 138. The nut 138 holds a so-called kickstand portion (or inner hub) 140 of the aft hub 128 in axial compression to complete the compressive force transmission path through the rotor. The example aft hub 128 also has an outer hub or driving section 150 coupled to a corresponding forward portion 152 of the HPT rotor to allow the HPT rotor to drive rotation of the HPC rotor as a high spool unit. In various embodiments, the shaft 130 may continue through to join with or become an HPT shaft. In the example shown, the hub 126 forward of the junction between the threaded sections 132 and 134 again becomes a portion of a high spool shaft and may mate with bearings, accessory drives, and the like.

The various disks have radially inboard protuberant bores 163 connected via thinner intermediate radial webs 162 to outer rim sections 164.

Figure 1A:
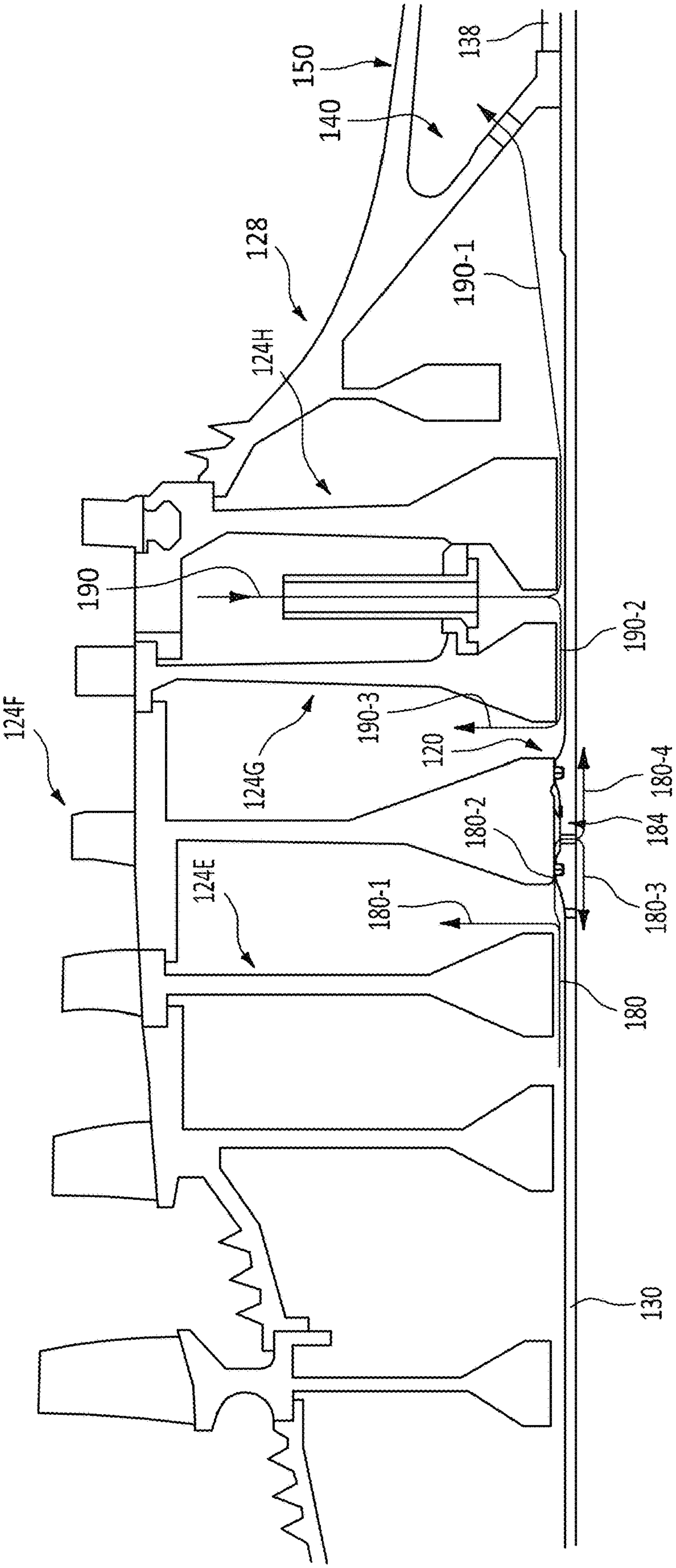
FIG. 1A is an enlarged view of the rotor of FIG. 1.

FIG. 1 shows a first leakage or bleed flow 180 from relatively upstream in the compressor. An additional leakage flow from yet downstream in the HPC is shown as 190. The seal system 120 partially isolates these flows from each other. This flow 190 passes radially inward between the disks 124G and 124H, then principally passing rearward/aft as a branch 190-1 (FIG. 1A) between the bore ID surface of the disk 124H and the shaft OD surface to ultimately pass through a circumferential array of apertures in the inner hub/kickstand 140 for HPT cooling. A further branch 190-2 may pass forward between the bore ID surface of the disk 124G and the shaft OD surface to ultimately pass radially as a branch 190-3 outward between the disks 124F and 124G to cool such disks.

Figure 2:
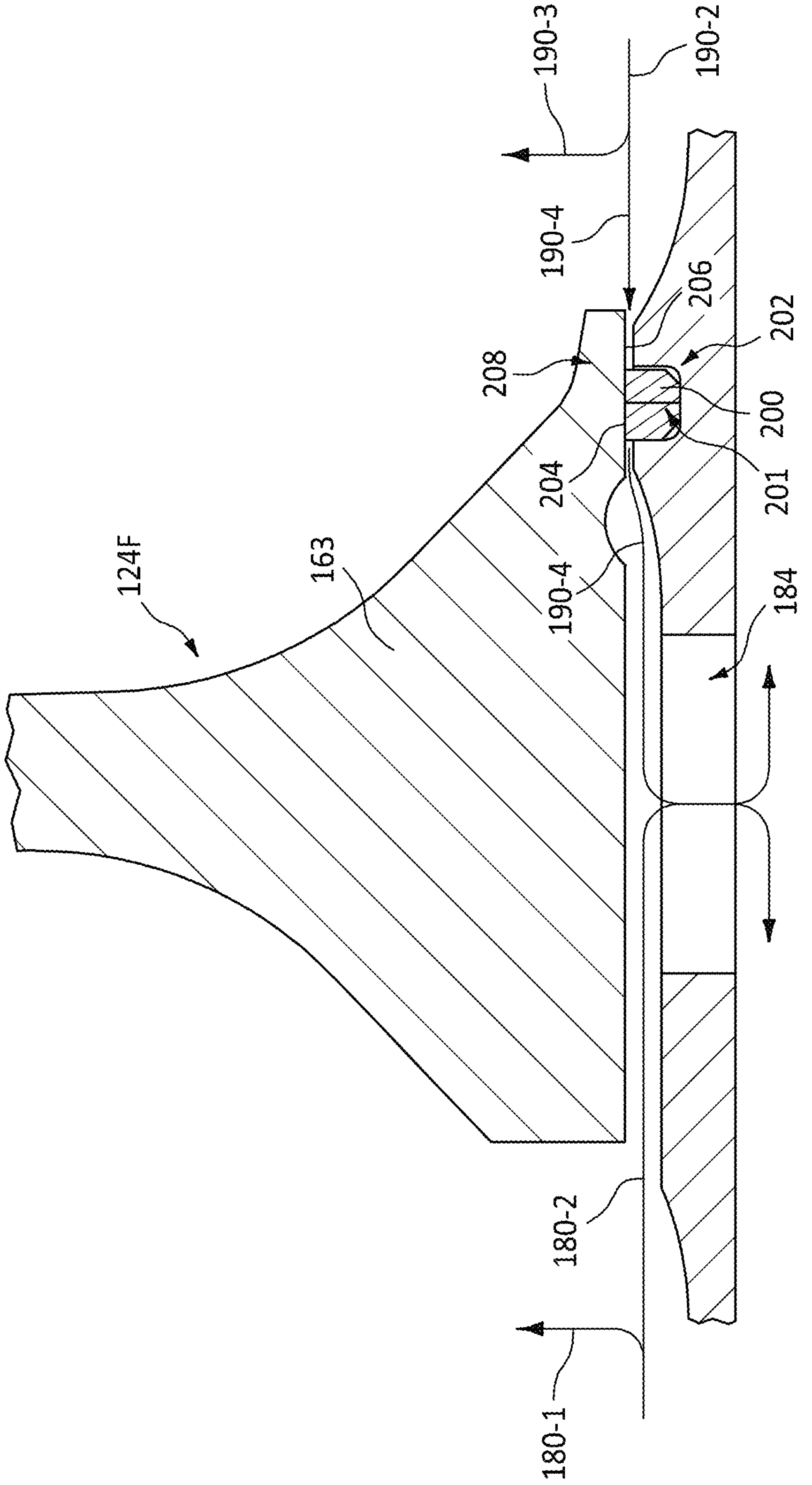
FIG. 2 (PRIOR ART)
FIG. 2 is a view of a prior art seal region.

FIG. 2 shows a hypothetical baseline seal as a piston seal ring (PSR) 200 captured in a groove 202 in the shaft and having an OD surface 204 engaging an ID surface 206 of the associated disk bore (e.g., in this case, a rearwardly extending foot 208). The example seal 200 is a one-piece split ring seal with a single split. Alternatives include two-piece seals with two shiplap interfaces or four-piece seals with four interfaces. The split creates an asymmetric leakage flow (190-4 branching off 190-2 with 190-3) through the seal split 201 (e.g., shiplap joint). A number of proposals attempt to compensate for this by introducing additional leakage flows to mitigate the asymmetry. However, the additional leakage flows do not fully eliminate asymmetry.

The FIG. 2 embodiment dilutes the asymmetric flow 190-4 with a more symmetric flow 180-2. Flow 180 passes between the ID surface of the bore of the disk 124E and the OD surface of the shaft 130 with branch 180-1 then passing radially outward between disks 124E and 124F for cooling and branch 180-2 passing rearward between the bore 163 of disk 124F to merge with the flow 190-4 and pass radially inward through a circumferential array of apertures 184 in the shaft. The combined flow may further branch into flows with a first branch passing rearward through an annular plenum between shaft 130 and a low speed/pressure rotor (spool) shaft for bearing compartment buffering and, optionally, a second branch passing forward for bearing compartment buffering.

Figure 1B:
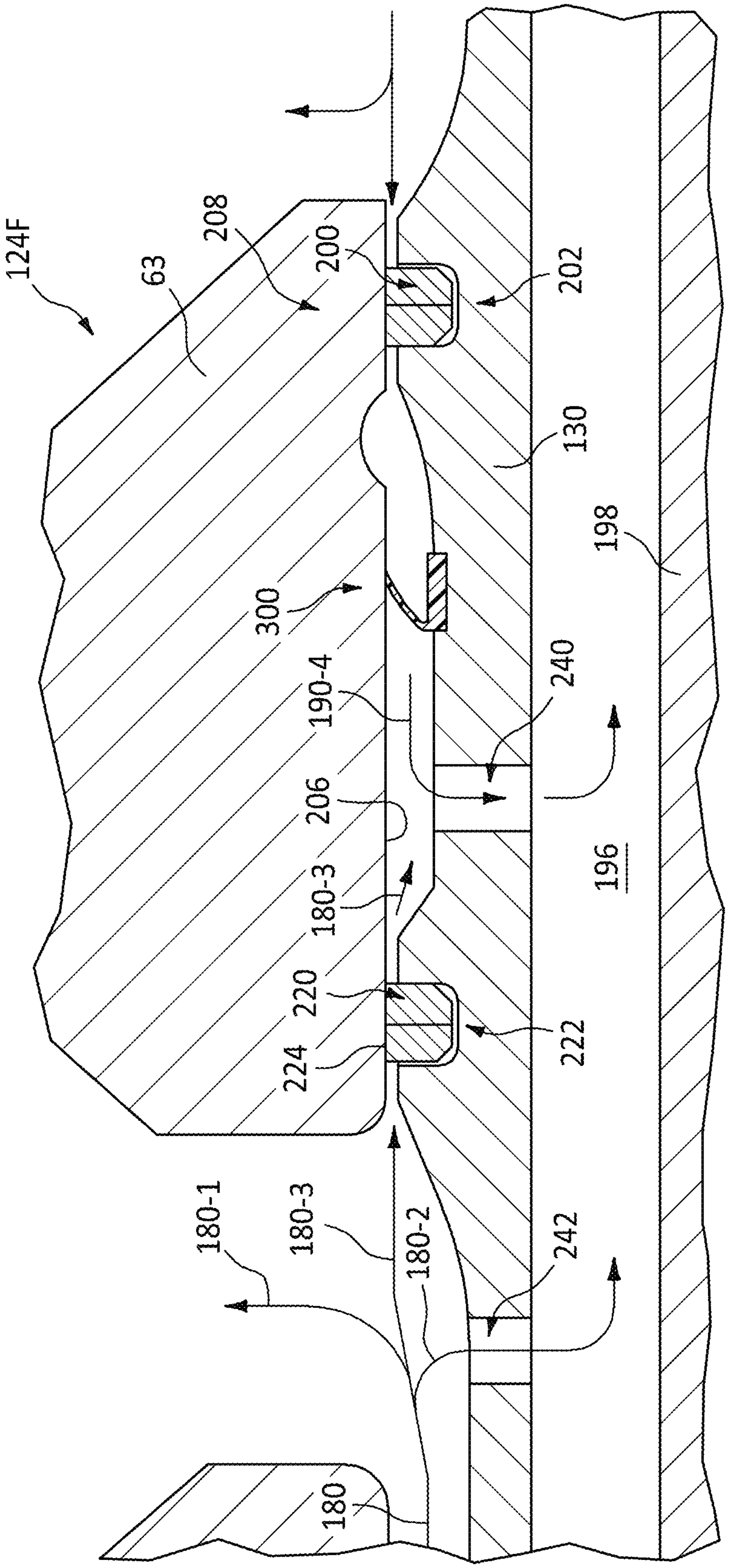
FIG. 1B is a further enlarged view of a seal region of the rotor of FIG. 1.

FIG. 1B is an enlarged view of the seal system 120 interactions with the shaft and the associated disk bore.

The revised engine of FIG. 1B essentially maintains a sealing ring 200 from the baseline but adds an additional shaft groove 222 and PSR 200 spaced ahead of the baseline groove 202 and PSR 200 so that the additional PSR outer diameter (OD) surface 224 seals against the ID surface 206 of the same disk bore. Due to the additional sealing, the baseline flow through holes 240 inboard of the disk bore is greatly reduced relative to the flow through baseline holes 184. Accordingly, the total cross-sectional area of such holes 240 may be further reduced relative to 184. This may involve some combination of reducing individual hole area (e.g., reducing the diameter of circular holes) and reducing hole count. To compensate for this loss in flow, an additional circumferential array of holes 242 may be added forward of the additional groove 222. The hole 240, 242 sizes and positions may be selected to preserve an amount of buffering airflow entering the inter-shaft plenum 196 between the shaft 130 and the low spool shaft 198. In the illustrated example, a main buffering branch 180-2 of the flow 180 passes inward through the holes 242 and a smaller flow rate branch 180-3 bypasses the seal 220 (e.g., as an asymmetric leakage through its joint (e.g., shiplap)) to, in turn, mix with any reduced flow rate flow 190-4 (reduced relative to its FIG. 2 counterpart and potentially further reduced as discussed below).

In one particular example the relative size and distribution of the holes 240, 242 are such that the holes 242 are smaller in combined area than the holes 240 and smaller in count. The holes 240 may generally preserve the flow area from the baseline holes. Example total area of holes 242 is up to or less than half that of holes 240 (e.g., 10% to 50% or 15% to 30%) with an example being holes of the same diameter and six holes 242 v. twenty-four holes 240.

Figure 1C:
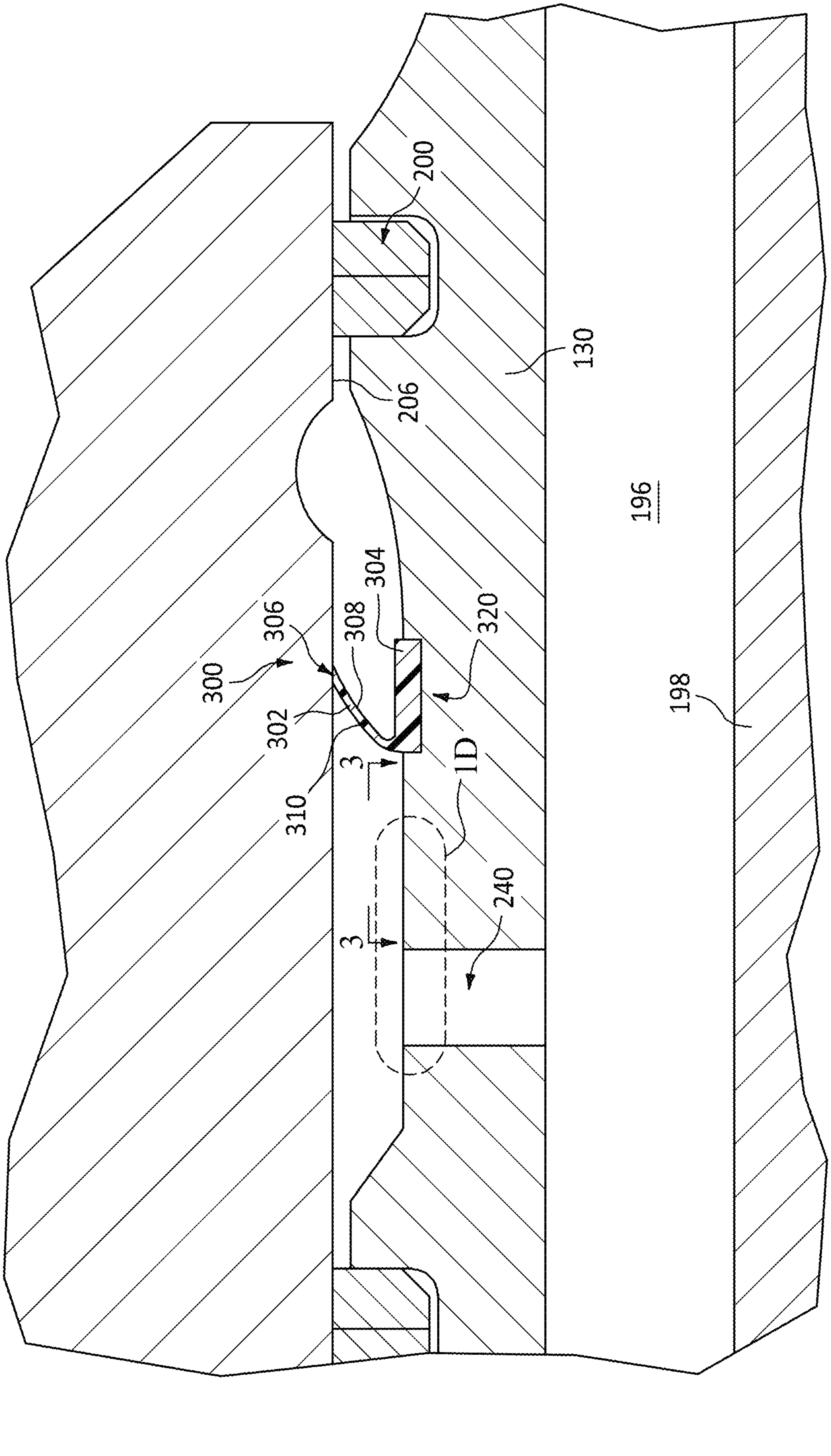
FIG. 1C is a further enlarged view of a seal region of the rotor of FIG. 1.

A further change from the baseline is the addition of a non-PSR seal 300 between the aft seal groove 202 and the holes 240. The FIG. 1B example is a so-called finger seal wherein a circumferential array of leaves or fingers 302 (FIG. 1C) protrude from a base 304. The example fingers extend to distal ends 306 and have an inner face 308 and an outer face 310. The inner face generally radially faces the base 304 and the outer face generally radially faces away from the base. The example seal orientation places the base 304 radially inward with the fingers extending radially outward. Furthermore, the fingers extend from roots at a forward end of the base aft to the distal ends/tips. This causes higher pressure aft to energize the seal and bias the fingers outward for improved sealing with the disk bore ID surface 206. The example base 304 is secured to the shaft at least partially received in an annular groove 320 of the shaft. Depending upon implementation, the fingers may overlap. Additionally, the fingers may have a circumferential/tangential directional component of their projection from proximal to distal.

The finger seal yet further limits the flow 190-4 relative to the baseline. In addition to limiting the flow, it helps further circumferentially distribute the flow to spread any hot spot or thermal asymmetry (e.g., from the PSR split) to a larger circumferential zone but with smaller magnitude. The finger seal synergizes with the aft PSR in that a finger seal alone would likely not be able to handle the full pressure drop. In contrast, relative to the PSR 200 and finger seal 300 combination, adding yet an additional PSR in place of the finger seal would suffer from being subject to similar wear or other variables to the baseline PSR it is paired with.

Among further potential advantages is that the staging of the ventilation means that each of the two stages of holes compromises shaft strength less than the compromise of a single stage of holes of the baseline. This can allow for beneficial effect on strength and weight in some combination such as increasing strength at a given weight, decreasing weight at a given strength, or decreasing weight disproportionately to any strength decrease for increasing strength disproportionately to any weight increase.

In further variations, other forms of additional seal (if present) may be substituted for the finger seal. In general, these may preferably be non-contact seals (discussed below) to reduce wear. Finger seals may themselves come in both contact and non-contact form. The non-contact form may operate by a hydrodynamic action.

Additionally, a further group of seals utilize similar fingers as the energizing elements to bias an unsegmented sealing element. For example, the fingers may be embedded in or may back a continuous full annulus elastomeric member with sufficient flexibility/stretchability to accommodate movement of the fingers that serve to energize the seal.

A further group of non-contact seal examples is labyrinth seals. One particular group of labyrinth seals has one or more radially outwardly projecting members (e.g., knife edges) projecting from the shaft 130 toward the bore 63 ID surface.

Figure 1D:
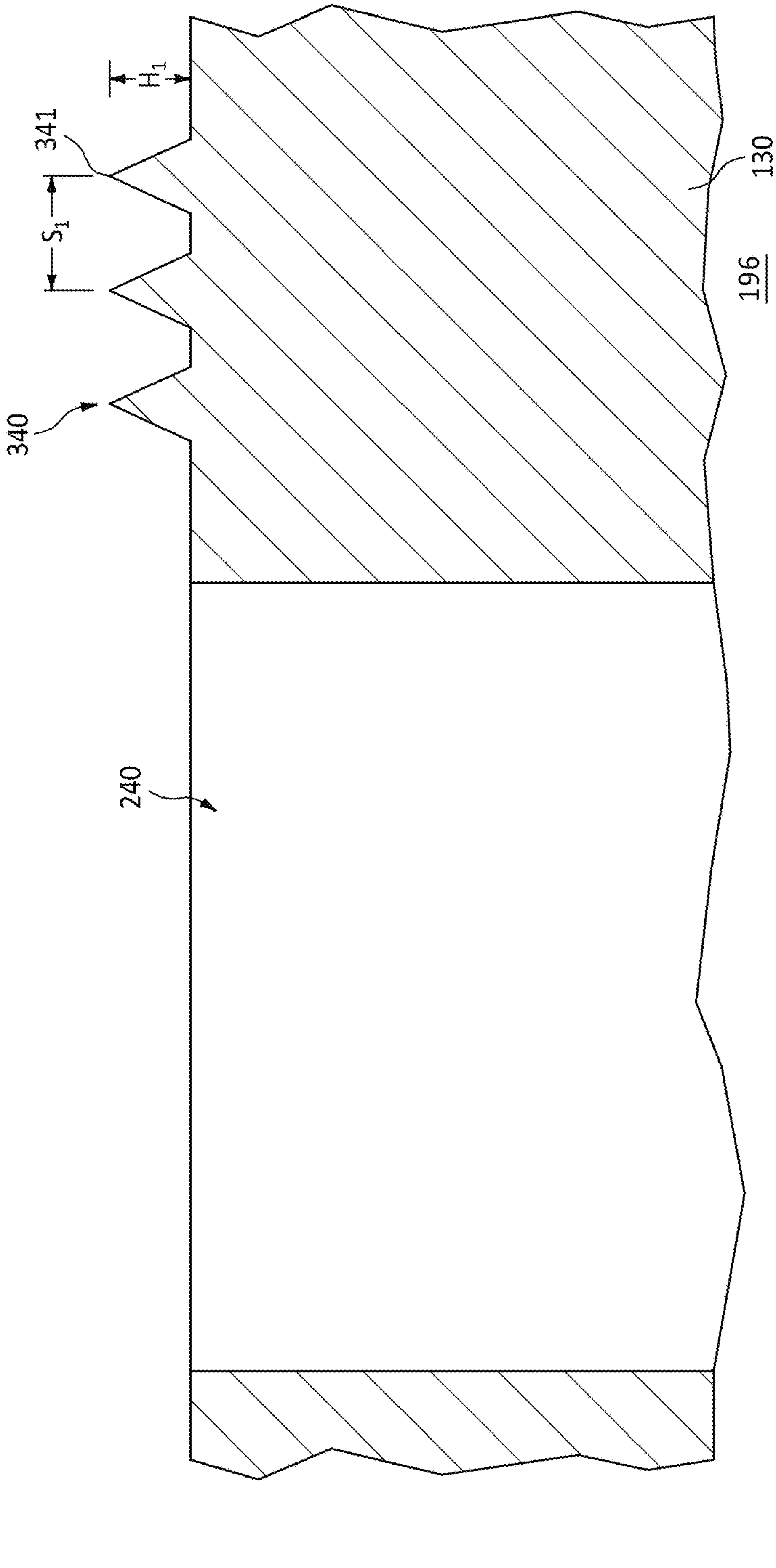
FIG. 1D is a further enlarged view of an outer diameter (OD) shaft surface region.
Figure 3:
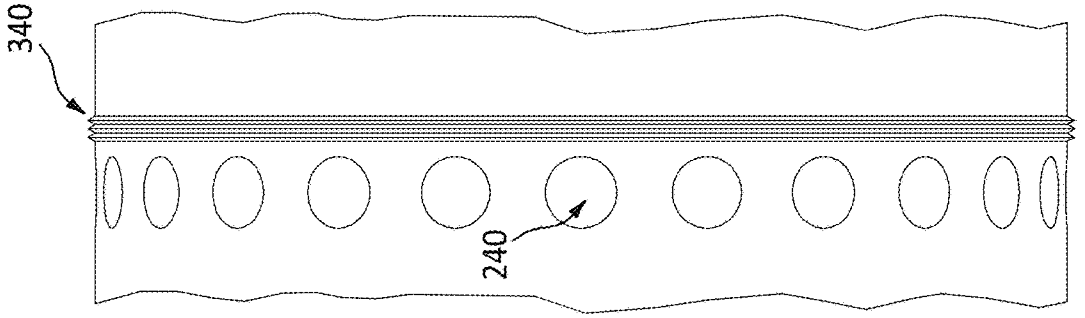
FIG. 3 is an inward radial view of texturing on the outer diameter (OD) shaft surface is a sectional view of a first modification of the seal region of FIG. 1B.

As a further variation, FIG. 3 shows the addition of surface enhancements such as trip strips 340 on the OD surface of the shaft between the groove 202 and holes 240. In particular, example trip strips are between the additional non-PSR seal 300 and the holes 240. The example trip strips further create turbulence of the flow 190-4 to encourage its mixing with the flow 180-3. In addition, the trip strips enhance heat transfer between air and the disk bore ID surface to promote thermal conditioning of the disk bore. This becomes relevant relative to the baseline because the baseline only seals at one end, leaving ample FIG. 2 flow 180-2 to condition the disk. The example trip strips 340 are of generally triangular cross-section (FIG. 1D) with radially outward apexes 341 and are distributed as purely circumferential full annulus ridges/rings (FIG. 3). The example has three such ridges/rings and alternatives may include two to eight. An example on-center axial spacing $S_1$ is about 15 mil (0.38 mm), more broadly 0.20 mm to 1.5 mm or 0.25 mm to 1.0 mm and an example radial span or height $H_1$ is about 20 mil (0.51 mm), more broadly 0.40 mm to 1.5 mm or 0.40 mm to 1.0 mm. Although example $H_1$ is greater than example $S_1$ (e.g. 110% to 150%), a broader range is 50% to 200%. Such ridges may be formed by machine turning. The various heights and spans, etc. may be average around the circumference (e.g., mean, median, or modal) values.

Figure 4:
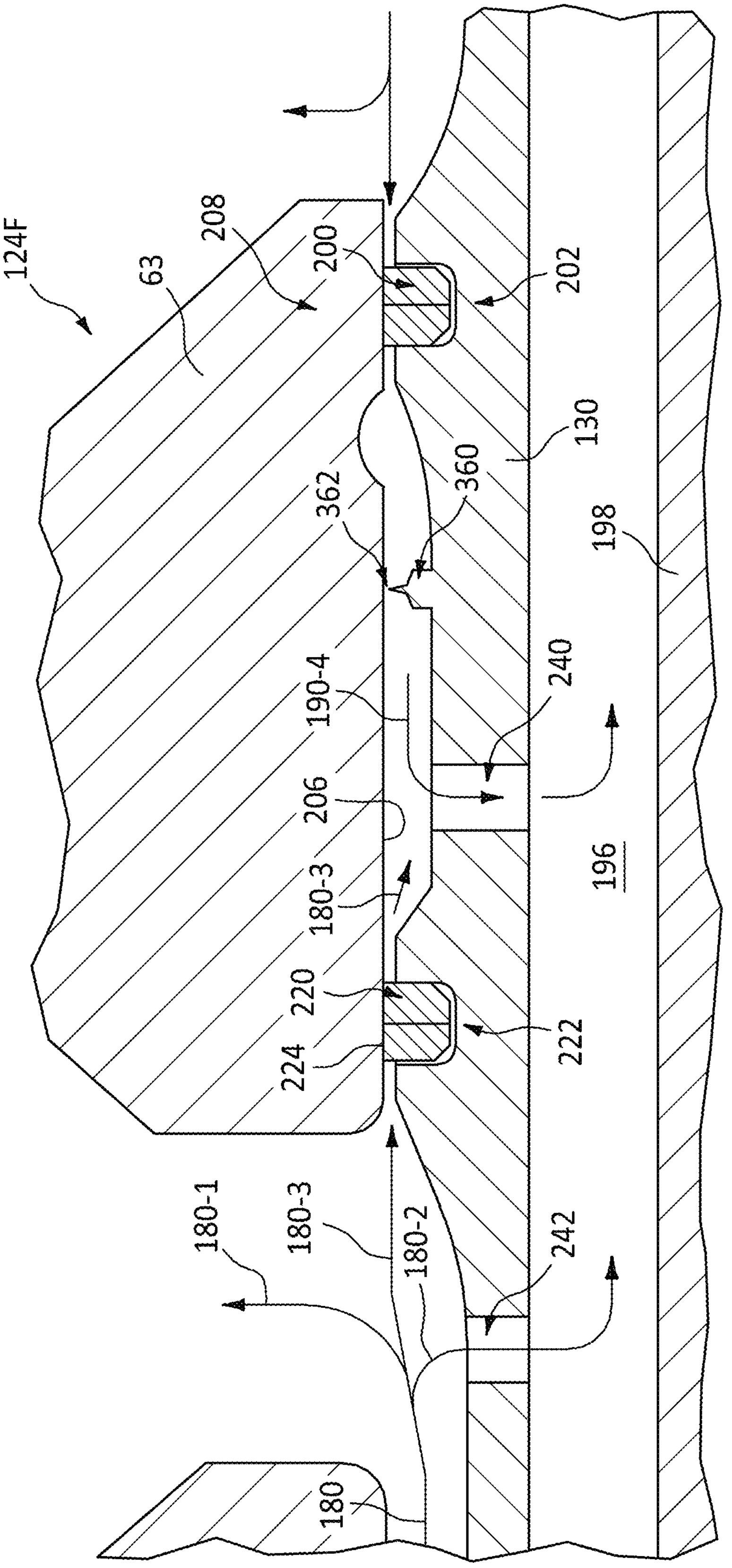
FIG. 4 is a view of a second modification of the seal region.

An alternative variation of FIG. 4 replaces the finger seal with a radial protrusion such as an annular knife edge seal or discourager 360 separated by a gap 362 from the inner diameter surface of the bore. An example nominal centered racial gap in a running condition is about 10 mil (0.25 mm). In a static condition such gap may be similar, more broadly 0.20 mm to 0.50 mm or 0.20 mm to 0.40 mm.

Alternative trip strip variations include circumferential zigzag or sawtooth patterns (not shown). Such may include multiple circumferential zigzags one ahead of the other (e.g., an example two to five full circumferential zigzags from fore to aft). An example on-center axial spacing is about 15 mil (0.38 mm), more broadly 0.20 mm to 1.5 mm or 0.25 mm to 1.0 mm, an example wavelength of the zig-zag is about 100 mil (2.5 mm), more broadly 1.5 mm to 8.0 mm or 1.5 mm to 5.0 mm, and an example height is about 20 mil (0.51 mm), more broadly 0.40 mm to 1.5 mm or 0.40 mm to 1.0 mm. Further alternatives (not shown) may be a single helix or a plurality of closely-spaced helical segments such as in a double-lead thread or yet greater.

Both the additional seal and the trip strips occupy axial space on the shaft outer diameter (OD) surface. Some baseline shafts may offer insufficient axial space for one or both of these additions between the FIG. 2 seal 200 and holes 184. Unless the total hole cross-sectional area is significantly reduced, one group of options for creating such real estate is to increase hole count while decreasing hole diameter to preserve total hole cross-sectional area. For example, if three times the number of holes 240 are used relative to the FIG. 2 baseline holes 184, individual hole area may be only one third that of the baseline and thus the hole radius of the revised holes may be the square root of one third. The forward holes 242 may be generally similarly sized. In such examples, there may be fewer holes and lesser total cross-sectional area for the holes 242 than the holes 240. This may be much smaller area and/or much smaller hole count. For example, hole count of the holes 242 may be up to or less than half (e.g., 10% to 50% or 15% to 30%) of the count of the holes 240 and total cross-sectional area may be up to or less than half (e.g., 10% to 50% or 15% to 30%)

Component materials and manufacture techniques and assembly techniques may be otherwise conventional.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline engine or rotor configuration, details of such baseline may influence details of particular implementations. Accordingly, other embodiments are within the scope of the following claims.

What is claimed is:

1. A turbine engine rotor comprising:

a central shaft; and a disk stack having a plurality of disks encircling the shaft, and further comprising:

a first piston seal ring in a first groove in the central shaft and having an outer diameter (OD) surface facing or contacting an inner diameter (ID) surface of a disk of said plurality of disks;

a second piston seal ring in a second OD groove in the central shaft and having an OD surface facing or contacting said ID surface of the same said disk;

a plurality of holes in the central shaft between the first groove and the second groove; and an additional seal between the first groove and the plurality of holes.

2. The turbine engine rotor of claim 1 wherein:

the additional seal is a non-contact seal.

3. The turbine engine rotor of claim 1 wherein:

the additional seal is selected from the group consisting of finger seals and labyrinth seals.

4. The turbine engine rotor of claim 3 wherein:

the additional seal is a finger seal with a base mounted to the shaft and fingers projecting radially outward.

5. The turbine engine rotor of claim 3 wherein:

the additional seal is a labyrinth seal.

6. The turbine engine rotor of claim 1 wherein:

the shaft has a second plurality of holes axially forward of said second groove and at least partially aft of a bore of a disk immediately forward of said disk.

7. The turbine engine rotor of claim 6 wherein:

relative to the plurality of holes, the second plurality of holes is smaller in total cross-sectional area.

8. The turbine engine rotor of claim 1 wherein:

the central shaft has outer diameter surface enhancements between the additional seal and the second OD groove.

9. The turbine engine rotor of claim 1 wherein:

the outer diameter surface enhancements are a pattern of ridges.

10. The turbine engine rotor of claim 1 wherein:
the shaft is under axial tension.

11. The turbine engine rotor of claim 1 wherein:
the first piston seal ring and the second piston seal ring each have a shiplap split.

12. A gas turbine engine including the turbine engine rotor of claim 1 wherein the rotor is a high pressure compressor rotor and further comprising:
a high pressure turbine rotor co-spooled with the high pressure compressor rotor on a high spool;
a low spool comprising a low pressure compressor rotor and a low pressure turbine rotor;
a combustor; and
a gaspath sequentially through the low pressure compressor, high pressure compressor, combustor, high pressure turbine, and low pressure turbine.

13. A turbine engine rotor comprising:
a central shaft; and
a disk stack having a plurality of disks encircling the shaft and held in compression by tension in the shaft,
and further comprising:
a first piston seal ring in a first groove in the central shaft and having an outer diameter (OD) surface facing or contacting an inner diameter (ID) surface of a first disk of said plurality of disks;
a second piston seal ring in a second OD groove in the central shaft and having an OD surface facing or contacting said ID surface of the first disk;
a first plurality of holes in the central shaft between the first groove and the second groove; and
a second plurality of holes axially forward of said second groove and at least partially aft of a bore of a second disk immediately forward of said first disk.

14. The turbine engine rotor of claim 13 wherein:
relative to the first plurality of holes, the second plurality of holes is smaller in total cross-sectional area by at least 50%.

15. The turbine engine rotor of claim 13 wherein one or both of:
the rotor is a high pressure compressor rotor of a multi-spool engine; and
the second plurality of holes is fully aft of the bore of the second disk.

16. A turbine engine rotor comprising:
a central shaft; and
a disk stack having a plurality of disks encircling the shaft and held in compression by tension in the shaft,
and further comprising:
a first piston seal ring in a first groove in the central shaft and having an outer diameter (OD) surface facing or contacting an inner diameter (ID) surface of a first disk of said plurality of disks;
a plurality of holes in the central shaft
a non-piston seal ring seal between the first groove and the plurality of holes.

17. The turbine engine rotor of claim 16 wherein:
the non-piston seal ring seal is a finger seal or a non-contact seal.

18. The turbine engine rotor of claim 16 wherein:
the non-piston seal ring seal is a finger seal.

19. The turbine engine rotor of claim 16 wherein:
the non-piston seal ring seal is a labyrinth seal.

20. The turbine engine rotor of claim 16 further comprising:
a second piston seal ring in a second OD groove in the central shaft and having an OD surface facing or contacting said ID surface of the first disk, the plurality of holes between the non-piston seal ring seal and the second OD groove; and
a second plurality of holes axially forward of said second groove and at least partially aft of a bore of a second disk immediately forward of said first disk.

* * * * *